US009934168B2

(12) United States Patent
Griffin

(10) Patent No.: US 9,934,168 B2
(45) Date of Patent: Apr. 3, 2018

(54) METHOD AND SYSTEM OF CONNECTING AND SWITCHING GROUPED INPUT AND OUTPUT DEVICES BETWEEN COMPUTERS

(71) Applicant: Timothy E Griffin, Calgary (CA)

(72) Inventor: Timothy E Griffin, Calgary (CA)

(73) Assignee: Userful Corporation, Calgary, Alberta (CA)

( * ) Notice: Subject to any disclaimer, the term of this patent is extended or adjusted under 35 U.S.C. 154(b) by 0 days.

(21) Appl. No.: 14/523,925

(22) Filed: Oct. 26, 2014

(65) Prior Publication Data

US 2016/0117268 A1    Apr. 28, 2016

Related U.S. Application Data

(60) Provisional application No. 61/897,212, filed on Oct. 29, 2013.

(51) Int. Cl.
*G06F 3/00* (2006.01)
*G06F 13/12* (2006.01)
*G06F 13/10* (2006.01)
*G06F 13/42* (2006.01)

(52) U.S. Cl.
CPC ........ *G06F 13/102* (2013.01); *G06F 13/4282* (2013.01)

(58) Field of Classification Search
None
See application file for complete search history.

(56) References Cited

U.S. PATENT DOCUMENTS

| 7,114,112 | B2 | 9/2006 | Griffin | |
|---|---|---|---|---|
| 7,203,788 | B2 | 4/2007 | Liu | |
| 7,873,078 | B2 | 1/2011 | Stafford-Fraser | |
| 8,370,856 | B2 | 2/2013 | Peterson | |
| 8,375,138 | B2 | 2/2013 | Peterson | |
| 8,407,347 | B2 | 3/2013 | Zang | |
| 8,531,950 | B2 * | 9/2013 | Jaudon | H04L 67/02 370/230 |
| 2005/0210390 | A1 * | 9/2005 | Ono | G06F 3/14 715/730 |
| 2007/0296643 | A1 * | 12/2007 | Ben-Shachar | G06F 3/1438 345/1.1 |
| 2009/0083630 | A1 | 3/2009 | Peterson | |
| 2009/0322784 | A1 | 12/2009 | Sartori | |
| 2010/0131654 | A1 | 5/2010 | Malakapalli | |

(Continued)

*Primary Examiner* — David E Martinez

(57) ABSTRACT

A system, method, and computer readable medium for switching (via a hub connection device) peripheral devices (such as a display, keyboard, mouse, audio) between a primary computing device (such as an embedded computer or a network connected server) and a secondary portable personal computing device (such as a laptop, or a smartphone). The present invention relates generally to multi-user computing, docking stations, and embedded system on a chip computing and specifically to methods and systems for switching peripheral devices between multiple computers both for independent and/or multi-user operation. This invention enables a single set of peripherals to be used for both independent and docking station operation, increasing productivity for users of portable computing devices (through expanded peripheral access) and decreasing deployment costs for organizations (by supporting multiple use-cases via just a single set of peripherals).

22 Claims, 10 Drawing Sheets

(56) References Cited

U.S. PATENT DOCUMENTS

| | | |
|---|---|---|
| 2010/0164838 A1 | 7/2010 | Fisher |
| 2010/0180055 A1* | 7/2010 | Lyon .................. G06F 3/023 |
| | | 710/62 |
| 2011/0202689 A1* | 8/2011 | Koenig ............... G06F 3/038 |
| | | 710/9 |
| 2013/0283193 A1 | 10/2013 | Griffin |
| 2015/0113181 A1* | 4/2015 | Law .................... G06F 13/20 |
| | | 710/38 |

* cited by examiner

METHOD AND SYSTEM OF CONNECTING AND SWITCHING GROUPED INPUT AND OUTPUT DEVICES BETWEEN COMPUTERS

CROSS-REFERENCE TO RELATED APPLICATION

This application claims priority from U.S. Provisional Patent Application No. 61/897,212 filed on Oct. 29, 2013, which is hereby incorporated by reference.

FIELD OF INVENTION

The present invention relates generally to multi-user computing, docking stations, and embedded SOC computing and specifically to methods and systems for switching peripheral devices between multiple computers both for independent multi-user operation and for Bring Your Own Device (BYOD) type environments supporting both single and multi-user operation.

BACKGROUND OF THE INVENTION

Given the growing ubiquity of personal portable computing devices (PPCDs), from laptop computers to smartphones, and the increasing desire for organizations to support BYOD models and provide means for users to connect these devices into enterprise infrastructure, it seems desirable to provide for the easy methods of allowing PPCDs to take advantage of the large screens and keyboards and other input and output peripheral device infrastructure into which organizations have invested, but still allow this infrastructure to be utilized even when the PPCD is not present.

This invention enables the input and output devices attached to a "docking station" to be operated both when the docking station is attached to a PPCD, but also when the PPCD is not present (either via an embedded SOC computing device or via a connection to a centrally located multi-user primary computing device). For example a PPCD such as a laptop might employ a second large display and a full-sized keyboard and mouse for personal convenience in input and output. This invention provides a system and method whereby that same large screen and full-sized keyboard can be also be utilized for computing (by a multi-user central computer or a SOC embedded computer) even when the laptop is not present.

Desktop computers are expensive and difficult to maintain and generally offer far more computing power than is needed by a single user. The ability to share this computing power by locally connecting extra users to this PC is desirable.

Simultaneous sharing of a single personal computer via a single running instance of the operating system by multiple locally connected users is also known and growing in popularity. Companies such as Userful, Ncomputing, Windows MultiPoint Server 2010, etc. have all successfully commercialized this technology. In these situations several keyboards mice and monitors are locally connected to a single personal computer and groupings of these devices are created such that multiple users can independently operate these groupings. Generally such sharing is achieved by running a single instance of a single operating system that is used to create and regulate the assignment and grouping of devices as they are added or removed from the system.

Connecting multiple input devices (e.g., keyboards and mice) and multiple output devices (e.g., monitors) to a single computer for use by a single user has been a common application for a long period of time. Many computers have connections to support two or more monitors. Typically this is used to create an "Extended desktop" that spans across multiple monitors. The user chooses which monitors to use for a specific task drags windows from one monitor to another as needed. With the advent of USB keyboards and mice it is easy to connect two or more keyboards to a computer.

The current invention addresses this situation.

SUMMARY OF THE INVENTION

The invention is a system comprising a base device, the hub connection device, supporting/having a display adaptor connected to a (secondary) display, various USB devices (e.g. input devices, and audio devices), having a first connection method (up-link port) connecting the hub connection device to a primary server computing device via a network connection, and providing a second up-link port for connecting a secondary computing device, a portable personal computing device (PPCD) containing its own (primary) display. A method of operating the system comprises:

the step of detecting whether the PPCD has been connected, and switching to the PPCD the peripheral devices attached to the hub connection device such as the display, the display adaptor and other USB or other devices attached to the hub connection device;

the step of detecting that the PPCD has been disconnected and in the case of PPCD disconnection, switching and connecting the secondary display and the USB devices to another computer (e.g., establishing communication with over the network between the primary computing device and the hub connected device) and the step of repeatedly testing for the re-connection of the PPCD, and in the case of re-connection disconnecting (suspending communication between) the hub connection device and attached peripheral devices from the primary computing device (the server or the embedded computer) and reconnecting (re-establishing communication them to the secondary computing device (the PPCD).

In such a set-up a central server could power 50-100 "occasional" users only some of whom will be actively using the hub connection device as a zero-client terminal at any one time, the others would either be using it in docking station mode for their PPCD or might not be using the hub connection device at all. Henceforth in this description a server configured to address multiple hub connection devices will be called a primary computing device (or the zero-client server). The primary computing device stores uniquely identifiable information specifying each hub connection device, for example its network MAC address or another unique identifier such as the serial number of one or more devices within the hub connection device.

The video device addressed could be stand-alone device or could be one unit embedded into a larger display.

In one embodiment of the invention, the hub connection device once connected and in communication with the primary computing device stores uniquely identifying information about the primary computing device, e.g., the IP address or host-name of the primary computing device, in writable memory within the hub connection device, enabling the hub connection device to find and (re-)connect to the primary computing device over the network, and in response to switching within (e.g., the USB cable being detached from the secondary computing device, the PPCD), the hub connection device initiates an attempt to establish a connection over the network to the server.

In one embodiment of the invention, the hub connection device includes a hardware switch which switches the devices between the various connection methods in response to receiving an appropriate signal, the signal could be any of the following (the choice depending on the particular realization of the invention):

a) attaching or detaching a device (e.g., a USB device) via a cable;

b) establishing or disconnecting a wireless connection (e.g., wireless USB) between the PPCD and the hub connection device; or c) sending or receiving of an electronic signal via a communication (the user initiates the process by interaction with a GUI); or d) presence or lack of presence of an Ethernet connection (heart-beat) to the primary computing device which would tell the device to switch into USB mode; or e) pressing a physical button or switch either built into the hub connection device (e.g., a button);

f) pressing a physical button on an alternate device that is in communication with the hub connection device (e.g., via a remote control); or g) turning on or off a device that provides power to the hub connection device;

h) a signal sent from the primary computing device to the hub connection device, potentially initiated by user interaction or automated detection of certain circumstances; or i) a signal sent from the PPCD to the hub connection device, potentially initiated by user interaction or automated detection of certain circumstances.

In one embodiment of the invention, the hub connection device hardware includes a USB switch placed between the USB hub (containing all the devices) and the Ethernet bridge chip. The USB switch component allows the data path from the devices in the USB hub to be switched between multiple up-stream ports or connection methods (e.g., between a USB B-connector and an Ethernet bridge chip). The USB switch also allows priorities to be set between these up stream ports/connection methods. For example the hardware designer could set the USB B-connector to have a higher priority so that when the box is plugged in on the USB B-connector, the data path would be automatically switched to the corresponding port on the USB switch. This allows the devices to be switched between multiple host computing devices (in this case a primary and a secondary computing device). For example the secondary computing device might be connected via USB and the primary computing device might be connected via Ethernet. Switching the data path via the USB switch, has the effect of disconnecting all the devices (including the USB hub) as if they were unplugged from one host and plugged into another. Additional or alternative switching could be provided by building additional and/or alternatives connection methods into the hub connection device e.g wireless, thunderbolt, display port. For example the switching could be between multiple different networks (wired or wireless) or could be between multiple USB connections to multiple computers (which could be wired or wireless), or could be between a "system on a chip" type of device.

For example, in one embodiment of the invention the hub connection device could include a system on a chip (SOC) computer that boots an operating system and the USB devices (in addition to being switchable to a PPCD could also be switched (connected/disconnected) from this locally run operating system by the USB switch. Or potentially the devices could be switched between three modes of operation: locally running SOC computer (the built-in computing device), USB docking station for PPCD (the secondary computing device), and Ethernet connection to primary computing device. Many other possible configurations can be derived from this invention.

In one embodiment of the invention the PPCD relies on a network connection built into the PPCD (for example to access the Internet). In an alternative embodiment the hub connection device can optionally provide a "hard-wired" network connection for the PPCD (the network device being one of the devices embedded in the hub connection device and enabled and attached to the PPCD along with the other devices when the PPCD is docked to the hub connection device). In one implementation of this the network connection is provided by an additional Ethernet port in the device (one that enables a second optional network connection) that can be made available to the PPCD when in the docking station mode of operation. In an alternative implementation a single Ethernet port can be switched between being a device accessible to the PPCD (e.g., providing a USB Ethernet connection as one of the devices that is attached when the docking station is connected) and, when in zero-client mode of operation, being the connection method whereby the zero-client connects to its server. When docked this would provide the PPCD with a wired network connection offering different security settings or potentially higher bandwidth than would be available via the wireless connection. In one embodiment of the invention even though the physical port and Ethernet cable is the same, the Ethernet device provides a different MAC address, thereby enabling different network security settings to be applied to network traffic originating from the two different modes of operation (zero-client and PPCD).

In one embodiment the Ethernet connection to the primary computing device is maintained and the switch toggles device access to downstream USB devices between the two connected computers, the primary computing device connected via Ethernet, and the PPCD connected via USB.

In one embodiment of the invention, the hub connection device could include multiple graphics adaptors to enable multiple attached peripheral display devices to be switched between primary and secondary computing devices.

One embodiment of the invention could include specialized encryption/decryption of network traffic.

In one embodiment of the invention one or more LEDs on the hub connection device through various illumination patterns are are used to indicate the current operating mode of the hub connection device.

In one embodiment of the invention a USB cable for docking a PPCD to the hub connection device is labeled as such.

In one embodiment of the invention the hub connection device is thus a dual-function USB or Ethernet zero-client device that alternates between functioning as an Ethernet zero-client (in communication with a primary computing device) and as a USB docking station (in communication with a secondary computing device). This is useful in a broad range of environments such as:

a) corporate desktops b) public computing environments c) front-of room (e.g. Whiteboard) presentation sites d) seat-back entertainment systems In one embodiment of the invention the PPCD uses a connection other than USB. Due to cabling limitations a physical USB cable connection between the PPCD and the hub connection device may not be possible or desirable. In these situations the PPCD could potentially instead establish a connection with the hub connection device over a network connection (that could be wired or wireless). That network could for example use a wireless router to connect the PPCD to the primary computing device and the hub connection device. It could be established via wireless USB or another direct wireless protocol between the hub connection device and the portable personal computing device (PPCD) the user wishes to "dock". Here the primary computing device can serve as a broker to help setup a network connection between the hub connection device and the PPCD. The switching (instead of being done by a hardware switch within the hub connection device and instead of being based on the presence of an active USB connection) is done by the primary computing device changing settings in one of or both of the PPCD and the hub connection device both of which are in communication with the user's PPCD. Here the host primary computing device has an established network connection to the hub connection device and the PPCD device user communicates with the primary computing device to facilitate brokering the connection between the PPCD and the zero-client.

In one embodiment of this, the PPCD user accesses a web-page (which could be running for example on the primary computing device) enabling the user to download and install required device drivers (USB graphics adaptor, Ethernet bridge chip, etc.). The user might then click on a "connect to device" link that uniquely identifies both the display the user wishes to "dock to" (by the user selection) as well as the identity of the PPCD within the network (e.g. via its IP address). Once these two have been uniquely identified the primary computing device can undertake the work of connecting the two together over the network by:
  a) disconnecting/unlocking the remote network-connected USB hub from the primary computing device (making it available for a new connection);
  b) applying and locking the Ethernet bridge chip to the secondary computing device (the PPCD) (e.g. via the PPCDs device name or IP address) essentially making the PPCD the new server—and detecting all devices plugged into the USB hub;
  c) monitoring the ongoing connection status of the Ethernet bridge, reconnecting it to the primary computing device when the PPCD disappears from the network (or the user initiates disconnection);
  d) if necessary offering a link (including the IP address of the display device) to initiate a client-side connection request to enable the display device to be temporarily locked to the new server (the PPCD).

In one embodiment of the invention the hub connection device receives its power from a power-over-Ethernet connection eliminating the need for an external power adaptor and power plug. This power could still be provided to the hub connection device even when operating in docking station mode (when the PPCD is docked). Here the Ethernet connection to the local area network could be used to provide power the hub connection device via Power over Ethernet protocol. In one embodiment of the invention the hub connection device is embedded directly within the display. In a further embodiment, the power over Ethernet connection powers both the display and the integrated hub connection device.

In one embodiment of the invention the hub connection device is configured to provide both power and data delivery over the USB protocol to the PPCD. The hub connection device can also provide power (via for example the USB cable) directly to the PPCD and in one embodiment of the invention the hub connection device detects the specific type of PPCD and intelligently provides optimized power delivery (larger than the typical amounts of power supplied by standard USB, the amount of power being specific to the requirements of the particular PPCD) for example for recharging the PPCD's battery.

In one embodiment of the invention, the time to (re-)establish an Ethernet connection to the primary computing device can be reduced by having an isolated network where the DHCP server is in communication with the primary computing device (and are possibly on the same physical server or part of the same process). In this way when a zero-client device requests an IP address from the DHCP server, the DHCP server can directly signal/notify the primary computing device software of the identity of the zero-client device, significantly reducing start-up time.

In one embodiment of the invention when the PPCD is connected to the hub connection device, the hub connection device sends a specialized termination signal to the primary computing device. Thus such a signal is sent when it switches into "docking station mode". Enabling the primary computing device to respond differently to the disconnection of the devices than it would to other events that could cause the hub connection device to disconnect, such as the hub connection device being powered off, or an interruption to the network connection between the primary computing device and the hub connection device.

In another embodiment of the invention, the primary computing device determines if the hub connection device is still on the network (thereby indicating that the hub connection device is not in docking station mode) by checking if there is still a physical network connection to the device (for example by pinging the device or other similar low-level networking command). This enables the primary computing device to pro-actively determine whether the device has switched into docking station mode. This enables certain user interface elements to be presented within a GUI and also enables a user's session to be retained and returned to the devices once the docking station session is complete.

In one embodiment of the invention the primary computing device keeps the user's session alive while the device is being used in docking station mode, thereby enabling the user to resume where they left off once the PPCD is unplugged. (For example a teacher might be presenting to the class in zero-client mode, then a student might plug in their laptop PPCD and share something with the class, when the laptop was unplugged the zero-client would reconnect to the primary computing device and resume the saved or stored session where the teacher left off.) A password might be required prior to re-accessing the session. In one embodiment, the session is kept alive resident in memory, in another embodiment of the invention the state is saved and written to disk and re-launched or re-initialized after the device is reconnected.

In one embodiment of the invention, power to the hub connection device can be provided via a standard USB port. In this way the device can be powered off and on automatically along with the display. So if, for example, the display is a TV and is turned on an off via a remote, deriving power to the device via the USB port enables power to the hub connection device to be turned on and off along with power to the TV. USB bus power could also be good for other applications, for example in digital signage. Any display that has a free USB port could be used to power the hub connection device drawing power from a USB port on the display. Thus saving the need for an extra power outlet plug and a power adaptor. For displays (e.g., TVs) that have USB ports this offers a convenient and automatic way to power the hub connection device on and off (simply by powering on and off the display to which it is connected (for example via a TV remote or via a remote display management system). This prevents users from forgetting to power on the hub connection device when they turn on the display (avoiding user confusion and frustration) or forgetting to power off the hub connection device at the end of the day (saving power).

In one embodiment of the invention, the devices within the hub connection device are directly connected to by the PPCD's operating system, utilizing drivers resident within the PPCD operating system.

In another embodiment the drivers required by the PPCD operating system can be made available to the PPCD within a computer readable storage medium resident on the hub connection device. This enables easy and quick installation of PPCD's drivers even in situations where the user may not have an Internet connection to download the drivers. These drivers could for example be available within the USB hub on a USB storage device or as an auto-run device facilitating the driver installation and connection of the PPCD. In another embodiment of the invention, the drivers are provided by the primary computing device and made available to the PPCD via either: the hub connection device or the local network.

In another embodiment of the invention the PPCD operating system automatically downloads the required drivers over an Internet connection. In one embodiment of the invention the drivers for the devices in the hub connection device are resident on the PPCD and the devices attached to the hub connection device are made available to the PPCD.

In one embodiment of the invention, a direct wireless connection (e.g., wireless USB) is established between the PPCD and the hub connection device as the means that establishes the connection and switches the mode of operation.

In one embodiment of the invention some or all of the I/O devices are wirelessly connected to the hub connection device.

Any number of USB devices can be plugged into the hub connection device and these USB devices will be available to the PPCD and the zero-client in turn depending on the connecting and disconnecting of the PPCD.

In one embodiment of the invention, the device utilizes the same graphics adaptor chipset and/or audio adaptor chipset regardless of the connection method (e.g., whether connected via USB or connected via Ethernet).

In one embodiment of the invention while the hub connection device is attempting to connect to the primary computing device it displays helpful graphic images (stored in memory on the hub connection device) on the screen, to indicate what process is going on and specifies any user intervention required. In a similar embodiment of the invention graphical messages explaining the docking station mode of functionality are displayed on the screen, and by clicking on a link the user can obtain more information.

In one realization a "laptop" icon is shown on the screen to indicate the presence of a docking station facility. Users click this icon to learn how to setup docking station and download/install the drivers by viewing appropriate instructions. It could also provide a URL to download the drivers directly from the primary computing device to the PPCD.

In one embodiment of the invention, the primary computing device provides remote desktop protocols such as RDP, Citrix, or VMWare view enabling the hub connection devices to provide a thin-client session using industry standard protocols to end users.

In one embodiment of the invention when the display is powered by the primary computing device a welcome screen is displayed enabling the user to choose which type of session they wish to use.

In one embodiment of the invention when the display is powered by the primary computing device, instructions are provided to users on how to connect a PPCD and/or install the drivers for the hub connection device.

In one embodiment of the invention the primary computing device can be configured to overlay messages on top of all connected displays. This can be used for example in a school to create a silent school-wide "Alert broadcast system" that would broadcast the message to all displays addressable by the primary computing device within the building. This could be used for emergency alerts, evacuation info, announcements, friendly messages, drills, etc. providing an easy way to instantly distribute the alert across the entire school.

The invention provides a method of switching a hub connection device, and its attached peripheral devices comprising at least one input device and at least one display device, between a primary computing device being configured to support a plurality of terminals for simultaneous multi-user computing, and a secondary computing device, for providing: when in communication with the primary computing device, one of the plurality of terminals; and when in communication with the secondary computing device, additional peripheral devices for use by the secondary computing device's user. The method comprising: A hub connection device and attached peripheral devices switching between connecting to the primary and secondary computing devices; A primary processing structure running on the primary computing device, which, when in communication with the hub connection device: detects, the hub connection device and the attached peripheral devices; launches, a session; assigns, ones of the attached peripheral devices to the session; and configures, the ones of the attached peripheral devices via device drivers to enable user interaction with the session, the session and the device drivers running on the primary computing device; A secondary processing structure running on a secondary computing device, which, when in communication with the hub connection device: detects the hub connection device and the attached peripheral devices; configures, ones of the attached peripheral devices via device drivers running on the secondary computing device to support user operation of the secondary computing device.

In one embodiment additional devices attached to the hub connection device are automatically detected, configured and made accessible to the corresponding user session running on the primary or secondary computing devices.

In another embodiment in response to the switching to the secondary computing device, the hub connection device sends a dis-connection signal or message to the primary computing device.

In a further embodiment in response to the switching from the primary computing device to the secondary computing device, the corresponding user session on the primary computing device is suspended, the session being resumed upon re-establishing communication between the primary computing device and the corresponding hub connection device.

In another embodiment the hub connection device is drawing power from an external electrical power source, and when connected to the secondary computing device additionally supplies power to the secondary computing device to power and/or re-charge a battery within the secondary computing device.

In another embodiment at least one of said launching, assigning and configuring is carried out by an additional processing structure in communication with the primary computing device.

In another embodiment the hub connection device supports at least two connection methods and communication protocols, ones of which are used for being in communication with the primary computing device, and others of which are used for being in communication with the secondary computing device, said switching by the hub connection device being between the at least two connection methods and communication protocols.

In a further application of the previous embodiment the connection methods and communication protocols are ones of: Wired USB; Wireless USB; a Wired Ethernet connection; a Wireless Ethernet connection; a USB over Ethernet connection; a wired connection; a power over Ethernet (PoE) connection; DisplayPort; USB; USB over IP; Ultra-wideband wireless; bluetooth; zigBee; IEEE 802.11 a/b/g/n/ac and successors; WirelessHD; Power-line communication; a wireless connection; miracast; WiDi; RTSP; Apple Airplay; and Chromecast.

In an another further application of this embodiment said switching occurs via detecting, by the hub connection device, of ones of: connecting or disconnecting of wired data cable connections between the hub connection device and the secondary computing device; connecting or disconnecting of wireless connection between the hub connection device and the secondary computing device; presence or lack of presence of an Ethernet "heart-beat" connection; presence or loss of a data signal from the secondary computing device; power availability on a USB uplink port on the hub connection device; connecting or disconnecting of communication with the secondary computing device; receiving of a disconnection or switching message from a processing structure running on the primary computing device, the primary computing device being in communication with the hub connection device; receiving a disconnection or of switching command from a processing structure running on the secondary computing device, the secondary computing device being in communication with the hub connection device; receiving of a disconnection or switching command from a user interacting with the hub connection device; receiving of a disconnection or switching command from a user interacting with ones of the attached peripheral devices; receiving of a disconnection or switching command from a user interacting via the at least one attached peripheral input device with an application running within a user session on the primary computing device; timeout due to exceeding a pre-determined length of time in attempting to establish a connection with a primary or secondary computing device; and a signal generated by a user attaching or detaching a device from the hub connection device;

In another embodiment of the invention, during the launching of a session the primary computing device is configured to output a message to the at least one attached peripheral display device comprising any of: an authentication screen; a user session selection screen; a screen-saver; instructions or help messages; a progress indicator; a status indicator; an error message; a screen locked message; an advertising message; a digital signage message; a remote display connection to a thin-client server; or web-browser displaying a web-page.

In another embodiment, the hub connection device is identified by at least one unique identifier that is stored in computer readable memory that is in communication with the primary processing structure.

In a further embodiment, each of a plurality of hub connection devices being in communication with its respective attached peripheral devices, the association between the hub connection devices and their respective peripheral devices is stored in computer readable memory that is in communication with the primary processing structure.

In a further embodiment, the at least one unique identifier is any of: a MAC address, an IP address, a USB path, a USB bus, a USB device ID, a PCI device ID, a device ID, a device serial number, a device manufacturer name, a device type, a number, a device vendor ID or product ID, and a configuration of attached devices.

In another embodiment, discovering ones of the hub connection devices and the attached peripheral devices by discovery agents running on ones of the primary and secondary computing devices.

In another embodiment, the hub connection device is configured to output progress and status messages to the at least one attached peripheral display device during the switching and connecting.

In another embodiment, the at least one attached peripheral input device is a touch sensor component of a touch screen, and the at least one attached peripheral display device is a display component of the touch screen.

In another embodiment, the at least one attached peripheral display device is a display component integrated into the hub connection device.

In another embodiment, the attached peripheral devices are USB devices and the hub connection device includes a USB Ethernet bridge chip enabling the primary computing device connecting to this bridge chip to communicate with and use the attached peripheral USB devices behind the Ethernet bridge chip, as if they were directly connected to the USB bus of the primary computing device, and the secondary computing device to directly connect to the attached peripheral USB devices by a USB hub contained within the hub connection device.

In another embodiment, drivers for ones of the attached peripheral devices are stored on computer readable memory housed within either of: the hub connection device and made accessible to the secondary computing device when in communication with the secondary computing device; or the primary computing device and made accessible to the secondary computing device when the primary computing device and secondary computing device are in communication.

The invention provides a method of switching a hub connection switch and its attached peripheral devices comprising at least one input device and at least one display device, between an embedded computing device and an external secondary computing device, the method comprising:

A hub connection switch and attached peripheral devices switching between connecting to the embedded computing device and the external secondary computing device;

An embedded processing structure running on the embedded computing device, which, when switched to by the hub connection switch:

detects, the attached peripheral devices;

configures, to support user operation of the embedded computing device, ones of the attached peripheral devices via device drivers running on the embedded computing device;

A secondary processing structure running on the external secondary computing device, which, when switched to by the hub connection switch:
detects, the attached peripheral devices;
configures, to support user operation of the secondary computing device, ones of the attached peripheral devices via device drivers running on the secondary computing device.

In another embodiment the hub connection device switches between three different connection methods (and three different computing devices). The primary being a server connected to over the network, the second being an embedded SOC device (embedded within the device itself) and the third being a PPCD intermittently attached and detached from the hub connection device. Here the network connection to the server could be via a a zero client protocol via an independent chipset (such as a USB over Ethernet chipset) or could be via thin-client protocol powered by the SOC, wherein the SOC is making the devices available to the central server for a user session.

In a further embodiment, the switching occurs via detecting, by the hub connection switch, ones of: power availability on a USB uplink port of the hub connection switch; connecting or disconnecting of wired data cable connections between the hub connection switch and the secondary computing device; connecting or disconnecting of USB type-C connection between the hub connection switch and the secondary computing device; connecting or disconnecting of wireless connection between the hub connection switch and the secondary computing device; presence or loss of a data signal from the secondary computing device; connecting or disconnecting of communication with the secondary computing device; receiving of a disconnection or switching message from a processing structure running on the embedded computing device, the embedded computing device being in communication with the hub connection switch; receiving a disconnection or switching command from a processing structure running on the secondary computing device, the secondary computing device being in communication with the hub connection switch; receiving of a disconnection or switching command from a user interacting with the hub connection switch; receiving of a disconnection or switching command from a user interacting with ones of the attached peripheral devices; receiving of a disconnection or switching command from a user interacting via the at least one attached peripheral input device with an application running within a user session on the embedded computing device; timeout due to exceeding a pre-determined length of time in attempting to establish or re-establish a connection with the secondary computing device; and a signal generated by a user attaching or detaching a device from the hub connection switch; a button press on the enclosure of the embedded computing device.

In another embodiment, different secondary computing devices can be connected sequentially to the hub connection device.

In another embodiment, in response to user input into a user session selection interface, the primary processing structure then: launches the selected user session; assigns the attached peripheral devices; and configures, the device drivers running on the primary computing device for supporting said peripheral devices.

In another embodiment, the primary computing device is running a guest operating system virtually via a hypervisor for use by the user session and output to the at least one attached peripheral display device.

In another embodiment, the type of user session where the selected guest operating system instance is launched and/or configured by the primary processing structure for display on the at least one display device is based on any of: user input in response to an authentication screen; user input in response to or the user a session selection screen; the unique identity of a hub connection device stored in memory that is in communication with the primary processing structure.

In another embodiment, comprising a plurality of hub connection devices, each of the hub connection devices being in communication with a respective attached peripheral input device and a respective attached peripheral display device, and wherein said launching comprises launching a user session for each said hub connection device, said assigning comprises assigning each said hub connection device and said attached peripheral devices to a respective user session.

In another embodiment, comprising: configuring, by a processing structure, the primary computing device to: display a message on an attached peripheral display device; to receive input commands in response to the message from an attached peripheral input device;

In another embodiment, a processing structure running on the primary computing device checks for availability of a network communications route to ones of hub connection device previously in communication with the primary computing device as a means of determining availability status of hub connection devices no longer in active communication with the primary computing device.

In another embodiment, ending the user session on the primary computing device upon detection of, by a processing structure running on the primary computing device, any of: powering off of the at least one attached peripheral display device; powering off of the hub connection device; disconnecting the hub connection device from the primary computing device; receiving an input command from the user of the user session, the command being any of: an end-session command; a logout command; a switch user command; a shutdown command, or a specialized keystroke sequence, and receiving an input command from an administrator.

Below are several examples of possible use cases of various attached peripheral devices showing various embodiments and applications of the invention:

Example connecting to a front-of-room large interactive display. The large interactive display in a classroom is equipped with zero-client stations via Ethernet cable, each one having attached keyboard and mouse for student comment and presentation. However plugging a PPCD into the zero-client's USB port connects it to the front-of-room display and the software automatically sends Windows or Mac laptop video and audio to the front-of-room display system as is called for by the PPCD user.

Example Sophisticated Internet cafe: Guests to the internet cafe can either use their own PPCDs to dock (use and charge their PPCDs) or can use the hub-connection device and attached displays directly as a zero-client terminal as they would in a conventional Internet cafe. A single server can thus provide the needs of all stations (potentially adding in additional back up servers as required).

Example: Airplane or other seat-back entertainment system which supplies conventional centralized content delivery to multiple touch-screens provided within seat-backs. With this invention the screen could also serve to provide a second screen for a users USB connected PPCD, thus providing users with a larger "extended" display to increase productivity, and providing a more convenient touch-screen for users who want to play or interact with content directly on their PPCD. The same device could provide power delivery and charging to the user's PPCD.

Example, Interruption for messaging: In one embodiment of the invention the hub connection device can be actively switched back into zero-client mode (disconnecting it from the PPCD) by sending a signal from the primary computing device to the hub connection device, upon the receiving of which the hub connection device disconnects from the PPCD control, and the attached I/O devices are returned to the primary computing device. This can be useful in situations where certain messages need to be provided to all users (even those who are in docking station use), for example announcements, alert, messages, or training videos for example in an airplane, educational setting, etc. The hub connection device can then be actively disconnected after the message has completed and the display and other devices attached to the hub connection device switched back and returned to the PPCD.

BRIEF DESCRIPTION OF THE DRAWINGS

Embodiments will now be described more fully with reference to the accompanying drawings in which.

DETAILED DESCRIPTION OF THE DRAWINGS

Figure 1:
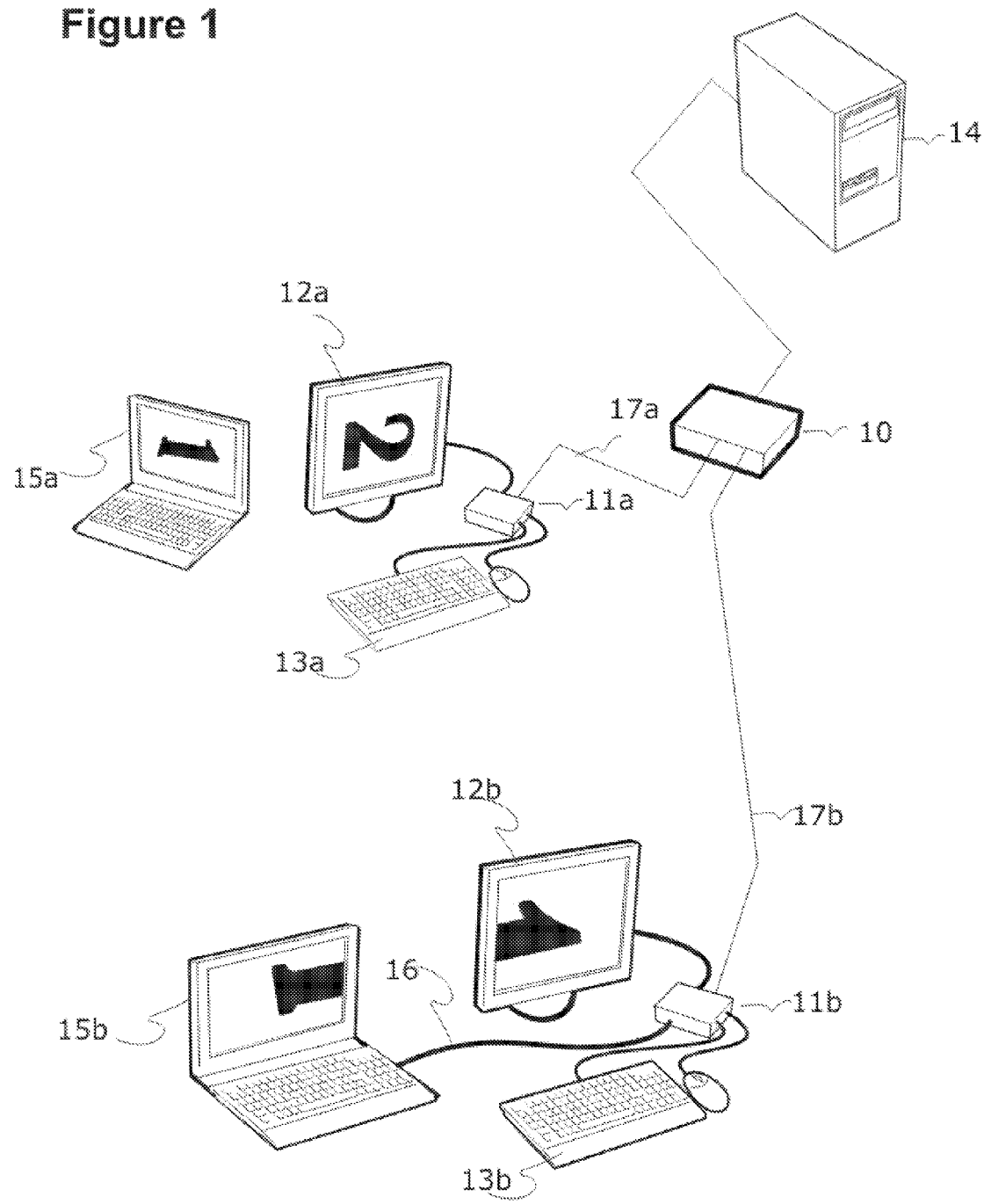
FIG. 1 is a perspective view of applications of one embodiment of the invention.

FIG. 1 shows the invention with two hub connection devices, 11a and 11b (in this case both zero-client devices) in communication with the primary computing device (14) (a zero-client server) and illustrates the two basic configurations. In the first configuration (top half of the display) the secondary computing device (15a), is a laptop, a Portable Personal Computing Device (PPCD) in independent operation. The hub connection device (11a) is operating as a zero-client, by virtue of its network connection (17a) through via a standard network switch, (10) to the zero-client server (14). Its attached display device (a monitor) (12a) and attached input devices (mouse and keyboard) (13a) are available for independent use. The second hub connection device in the lower half of FIG. 1 shows another secondary computing device (15b) again a PPCD laptop (15b) connected via USB cable wired connection (16) to the hub connection device (11b) and is functioning in "docking station mode". Due to switching within the hub connection device, the hub connection device, although it is still physically connected via the network connection (17b), is no longer actively in communication with the switch (10) and so is no longer providing the attached peripheral devices to the zero-client server (14). The hub connection device's attached display device (12b) is now supplementing the laptop's built in display (15b) and the keyboard and mouse (13b) are now available for use on the PPCD (laptop computer).

Figure 2:
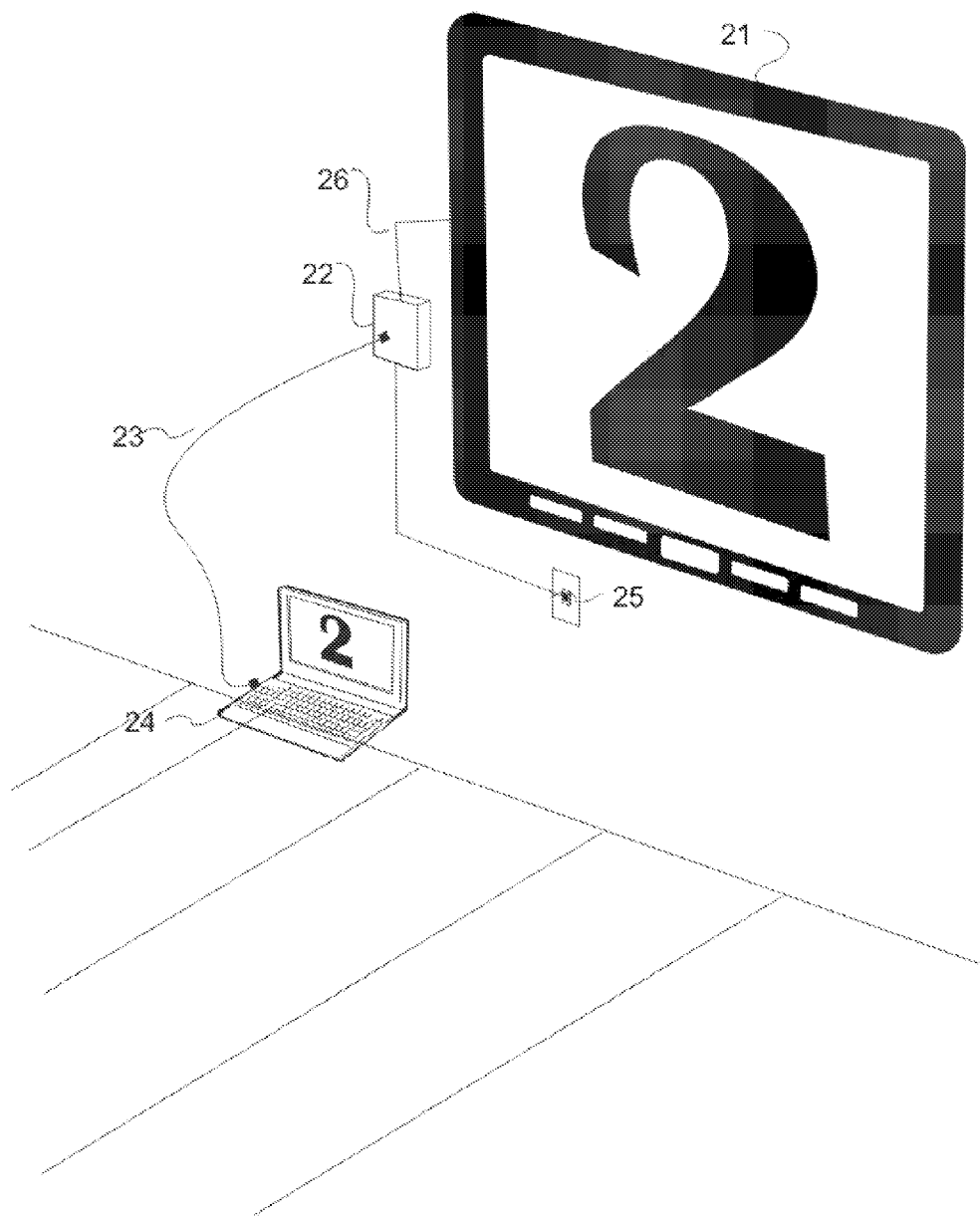
FIG. 2 is a second perspective view of a particular application of the invention.

FIG. 2 is a symbolic illustration of a simple application of the invention to a front-of-room display such as one might find in a meeting room or classroom. Here the PPCD (24) illustrated as a notebook is plugged into a hub connection device (22) using a USB extension cable (23), resulting in the video output of the notebook being displayed (in mirror mode) on the large front-of-room display (21). Since this large front of room display is an interactive display, the touch drivers for the display are enabled and running off the laptop (24). The laptop could be in communication with the display either by a hard-wired USB connection (26) or a wireless connection. Once the laptop was unplugged from the hub connection device (22) the hub connection device is plugged into an Ethernet network port (25) and would be centrally powered by the central server (not shown). To simplify the presentation the standard zero-client server that would used in zero-client mode has not been illustrated in this figure.

Figure 3:
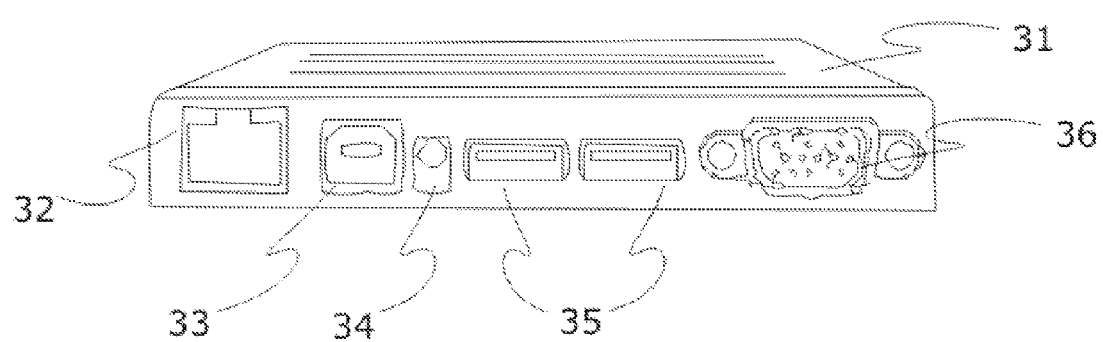
FIG. 3 is a perspective view of a hub connection device.

FIG. 3 is a detailed picture of one potential design for the hub connection device showing the device's housing (31), including potential communication ports such as the network connection port (32), a USB up-link port (33) for a USB connection to a secondary computing device such as a personal portable computing device (PPCD) connection, the power supply cord port (34), two downstream USB ports (35) and a display adaptor port for connecting to an external display (36).

Figure 4:
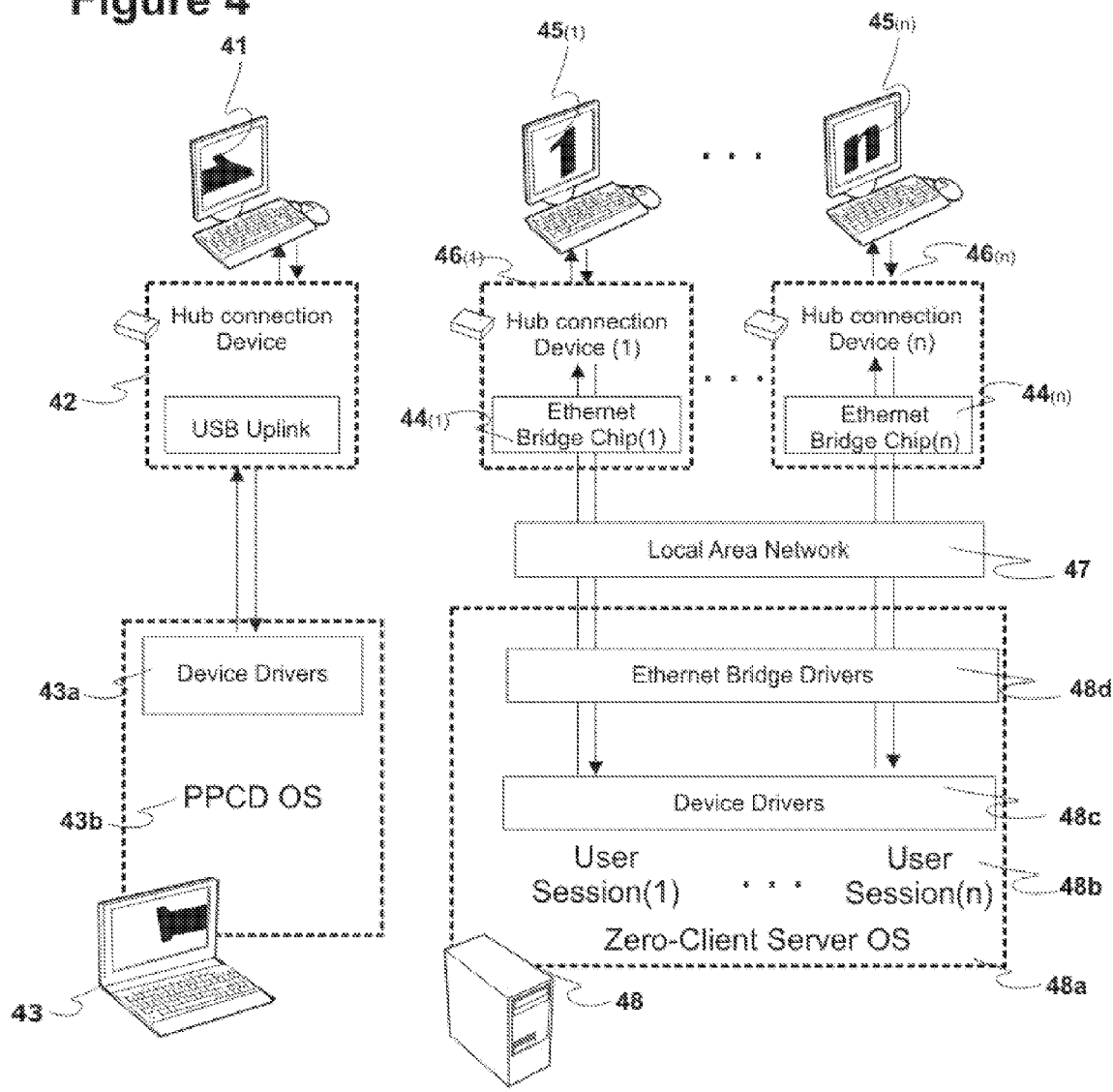
FIG. 4 is a block diagram of a multi-user computing system.

FIG. 4 is a schematic of a situation similar to FIG. 1, but with n+1 hub connection devices available to run simultaneously from the same primary computing device (48). The first of these is using the secondary computing device and the other n are operating through the primary computing device. It shows n of zero-client terminals running off the central server via multiple corresponding hub connection devices. The hub connection device on the extreme left (42), being connected via USB to the secondary computing device (43) (a notebook PPCD) is no longer in communication with the primary computing device (48) (the zero-client server) and the peripheral input and output devices attached to the hub connection device (42) are now connected to and running off the notebook PPCD. The n+1 sets of input and output devices (41) and (45(1)) to (45(n)) are connected to the hub connecting devices (42) and (46(1)) to (46(n)). The notebook zero-client server (42) is connected via the USB up-link in the hub connection device (42) to the PPCD notebook (43), the PPCD contains the device drivers it has downloaded (43a) giving the operating system of the PPCD (43b) access to the attached peripheral I/O devices (41). The remaining attached peripheral I/O devices (45(1)) to (45(n)), attached to other hub connection devices (46(1)) to (46(n)) are using their built-in Ethernet bridge chips (44(1)) to (44(n)) to make the devices accessible on the LAN, (47) and connecting them to the Zero-client server (48) and using the Ethernet bridge drivers (48d) and device drivers (48c) to ensure the attached peripheral devices are, in communication with the zero client server (the primary computing device) providing user sessions 1 to n, running on the zero-client server (48) and being output to the displays (45(1)) to (45(n)) for user interaction.

Figure 5:
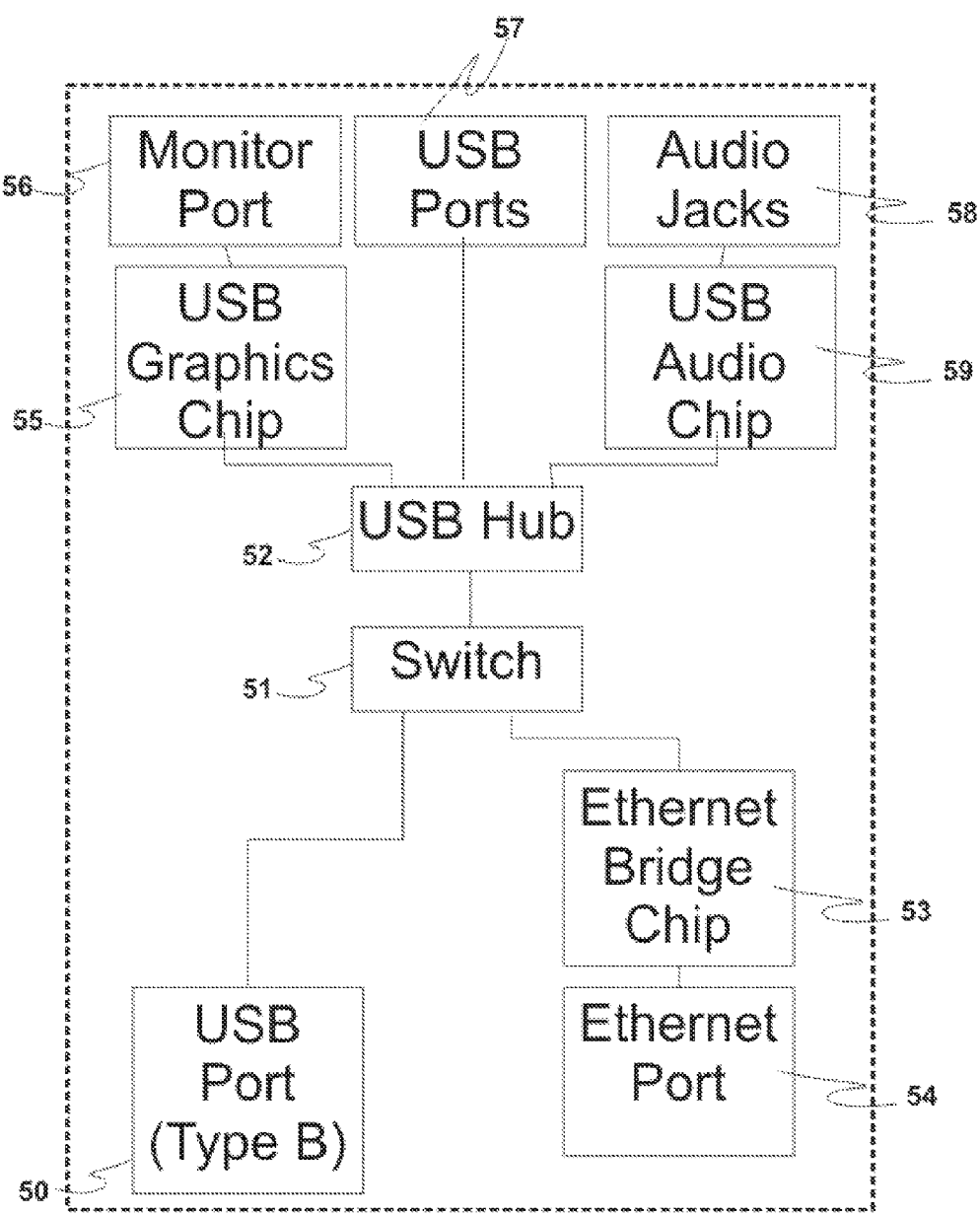
FIG. 5 is a schematic of the internal components of one embodiment of the hub connection device.

FIG. 5 is a schematic of the internal components of one embodiment of the hub connection device showing the relationships between the internal components. The switch (51) controls the connection of the USB hub (52) and all descending attached peripheral devices, in this schematic this includes: the USB graphics chip (55) to the monitor port (56); the USB audio chip (59) the audio jacks (58), and the USB ports (57) to which additional peripheral devices might be attached such as a keyboard or mouse. When a USB up-link connection is present, attached via the USB type-B port (50) the switch (51) toggles the USB hub (52) to be connected via the USB cable to the secondary computing device (the PPCD). When a USB connection is not present the switch (51) switches the USB hub and all descending devices to the Ethernet bridge chip (53) which then attempts to establish connection with the primary computing device via Ethernet attached to the Ethernet port (54), thus providing all the attached peripheral devices to the primary computing device.

Figure 6:
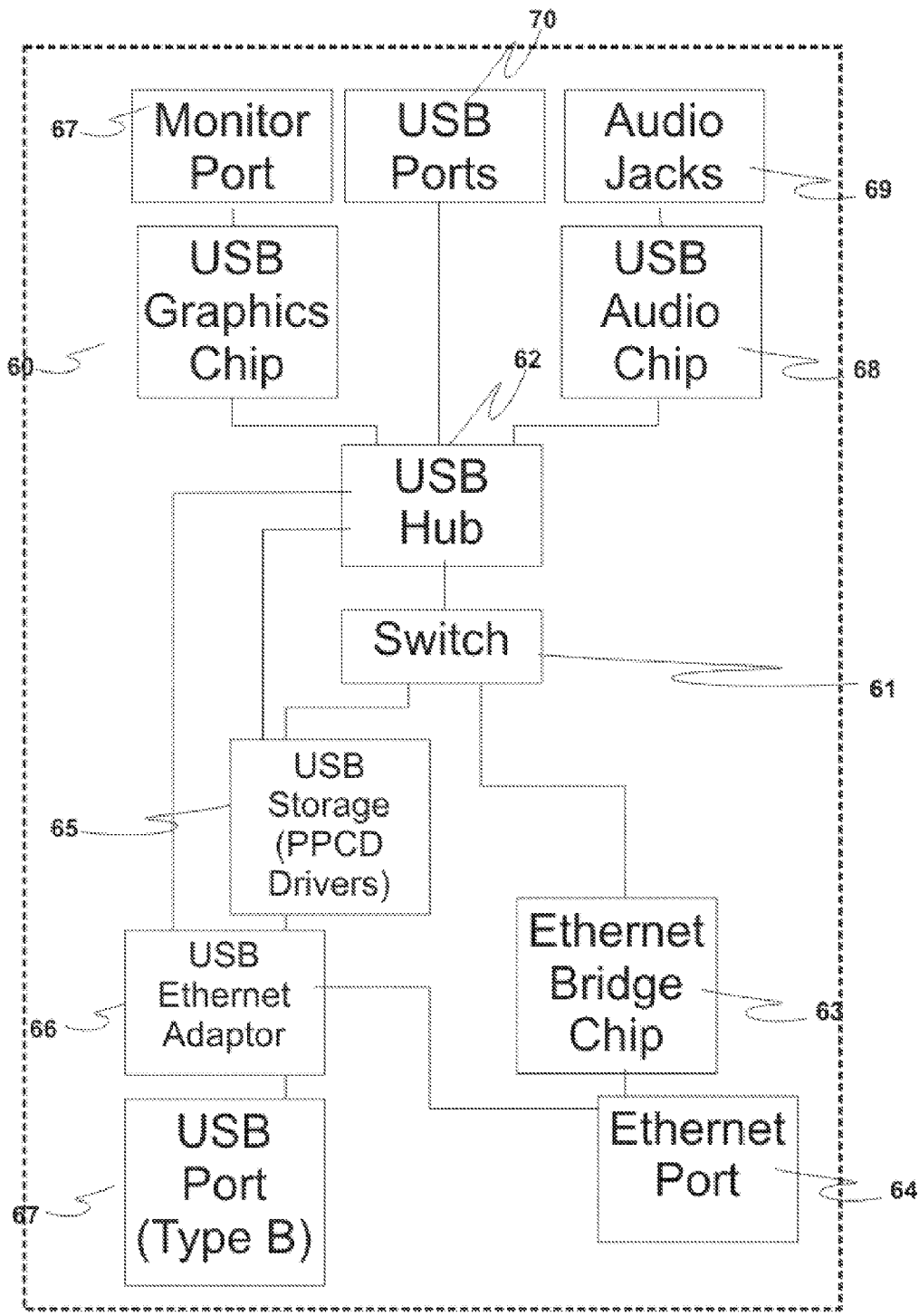
FIG. 6 is a schematic of the internal components of another embodiment of the hub connection device.

FIG. 6 is an alternative embodiment of the hub connection device with an embedded switch (61) wherein additional devices are made available under one mode of connection but not under another. In this illustration the additional devices are made available under a USB connection. The USB hub provides a monitor port (67) via the attached peripheral USB graphics chip (60), audio jacks (69), via attached peripheral USB audio chip (68) and USB ports (70) for additional user-attachable peripheral devices (e.g., keyboard, mouse, or USB key). In this example, under USB connection mode, but not under Ethernet mode, a USB Ethernet adapter (66) enables the secondary computing device to access a wired Ethernet connection via the Ethernet port (64) and/or to access a USB memory storage (65) (enabling the secondary computing device to directly load drivers from the hub connection device). In this way the PPCD when attached to the hub connection device via the USB type B port (67) would be connected to these additional devices. This not only provides drivers, but enables the single Ethernet cable to be switched back and forth between being a connection to the server and a wired Ethernet connection for the secondary computing device (PPCD).

Figure 7:
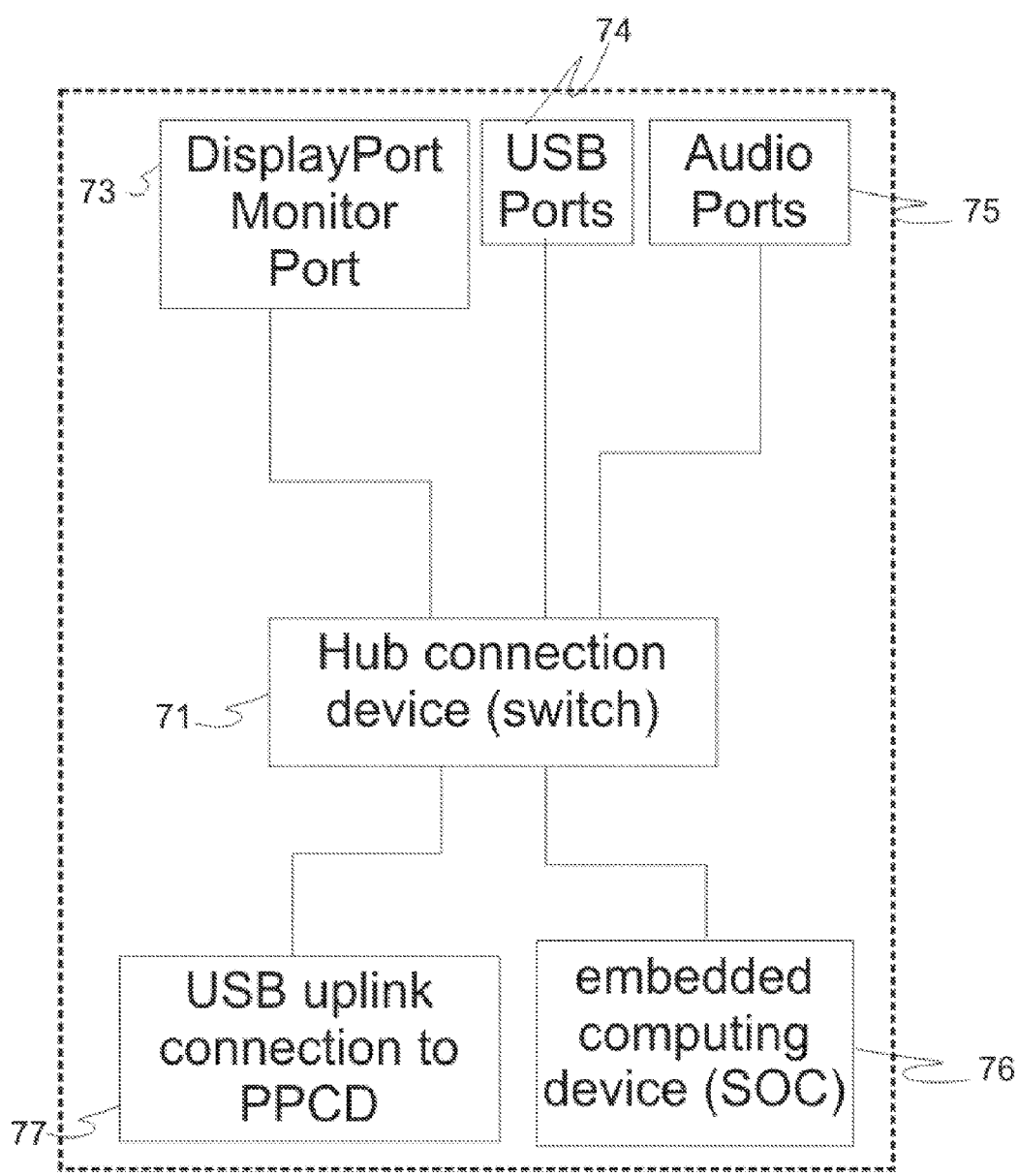
FIG. 7 is a schematic of the internal components of another embodiment of the hub connection device.

FIG. 7 illustrates an alternative embodiment of the invention where hub connection device (71) is a functional group of components within the device that switches the attached peripheral devices between an embedded SOC computing device (76) and a PPCD connected via a USB uplink connection (77). In this illustration the hub connection device is a component rather than a stand alone physical device that switches when a USB connection to the PPCD is detected. Here again the hub connection device (71) provides connection to a display via a monitor port (73), audio ports (75) and additional USB ports (74) for additional user-attachable peripheral devices (e.g., keyboard, mouse, or USB key). In this illustration the system could be a stand-alone device including the ports as depicted with the embedded SOC computing device, but this could also be embedded directly into a display or a touch screen where the display would be switched and alternatingly connected to the PPCD and the SOC. In this illustration the display adaptor is provided by the embedded SOC computing device and the PPCD respectively, although in an alternative embodiment an external display adaptor (similar to in FIG. 6 and FIG. 5) could be utilized and be amongst the attached peripheral devices that are switched.

Figure 8:
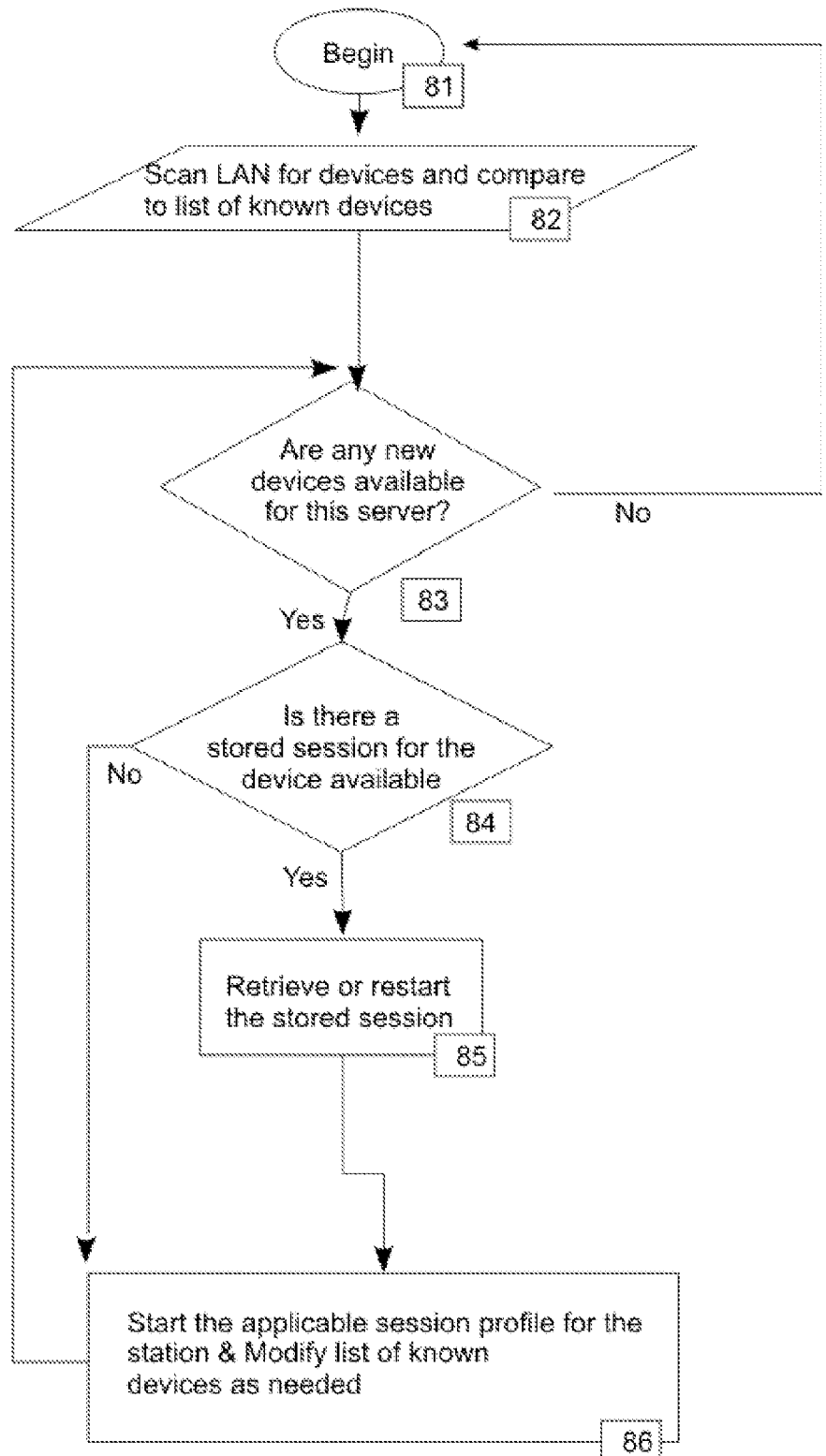
FIG. 8 is a flow-chart illustrating interaction of the primary computing device with the hub connection devices in connection with start up.

FIG. 8 is a flow-chart showing one implementation of typical use of the interaction with the hub connection devices in connection with the start up of the primary computing device (zero-client server), shown at 76 in FIG. 7. Beginning at (81) it scans the network to detect any available hub connection devices open to communication within the Local Area Network at (82). If there are no new hub connection devices found, at the decision point (83), it returns to the begin state (81) continuing to scan/detect for new hub connection devices, while if there are new devices found it continues to decision point (84). At this point it checks to see if there are any previously stored sessions tied to that specific hub connection device (using the MAC address of the hub connection device or some other unique identifier), if a stored session is found it is restored (85), if not it skips directly to step (86) starts the applicable session (either the saved session or a new user session) and displays the output of that session on the attached peripheral display device and receives input to that session from the attached peripheral input devices connected to that hub connection device. As part of starting the session modifications and drivers are loaded as required. Once that is accomplished return to checking for further new hub connection devices at (83).

Figure 9:
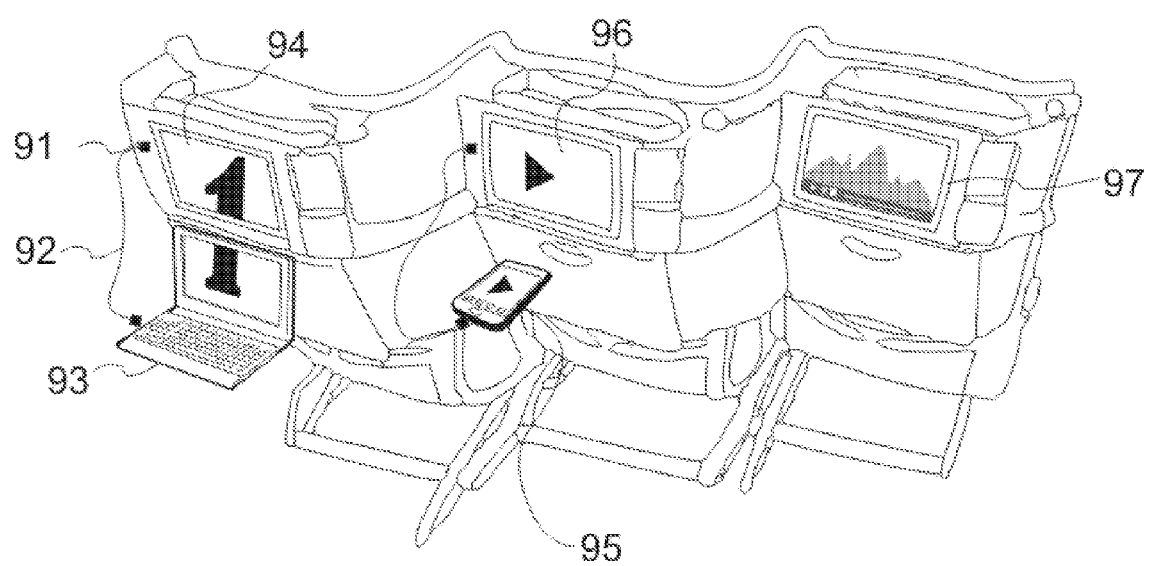
FIG. 9 is a perspective view of the application of the invention to seat-back displays.

FIG. 9 illustrates one potential application of the invention for use in a seat-back entertainment system, for example in an airplane or bus. Here the hub connection device is invisible as it is embedded into the display or the seat-back and the attached peripheral devices (both input and output) is the touch screen in the seat back. The figure shows three seats side-by-side, each illustrating a different use-case. The first seat illustrates a PPCD (93) connected to the seat-back display via a USB cable (92), here with an embedded hub connection device (at 91) providing the USB port and serving as as a docking station for the PPCD laptop. The laptop user is employing the display integrated into the seat-back as a secondary display to extend their working desktop. The second seat shows using the display to access content from a hand-held PPCD, a smart phone (95) attaching via a USB connection to the hub connection device (at 96). In this case the user is making use of the touch screen on the seat-back unit (running off of the zero client server) to interact with data on the smart phone. (perhaps to play a video stored on the user's smart phone on the display powered by the primary computing device, the zero-client server). Finally the passenger on the extreme right is using the seat-back unit (97) in a conventional way for stand-alone operation (input and output) powered by a central zero-client server.

Figure 10:
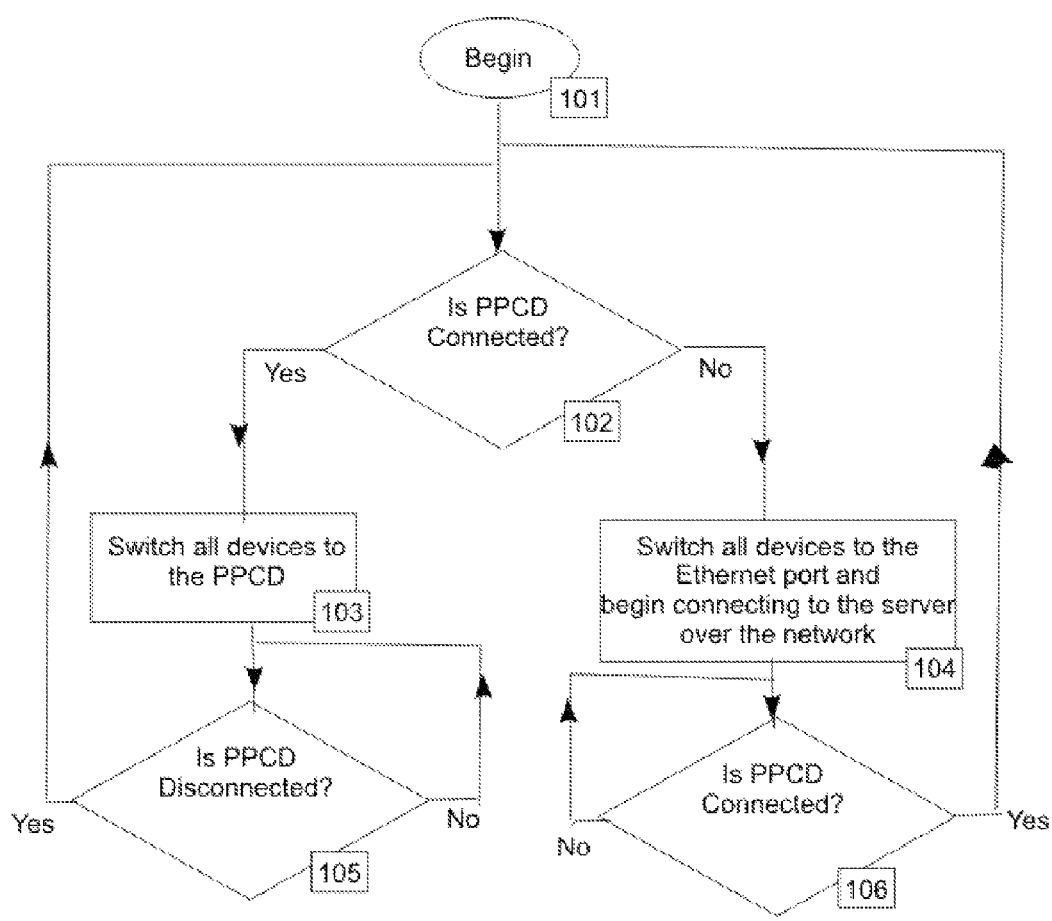
FIG. 10 is a flow-chart illustrating the logic structure in implementing a typical hub connection device.

FIG. 10 is a flow-chart illustrating the logic structure within one implementation of a typical hub connection device. Beginning at (101) it checks if a PPCD is connected to the hub connection device (102). If a PPCD is detected, the hub connection device switches all the attached peripheral devices to the PPCD at (103) and continues to check for the disconnection of the PPCD at (105) until such disconnection is detected, at which point it returns to the beginning (102). On the other hand if the test at (102) reveals that a PPCD is not connected it switches all devices to the Ethernet port and attempts to establish a network connection to the primary computing device (zero-client server) at (104) and continues to maintain this network connection while monitoring via a checking loop for a PPCD connection at (106) until it receives the message that a PPCD has been connected at which point it would return to (102) and proceed to switch all devices to the PPCD (103).

What is claimed is:

1. A method of switching a hub connection device, and its attached peripheral devices, comprising at least one input device and at least one display device, between a primary computing device being configured to simultaneously support a plurality of hub connection devices operable as independent terminals for multi-user computing, and a secondary computing device for providing expanded access via the attached peripheral devices:

the method comprising:

the hub connection device and its attached peripheral devices, being in communication with the primary computing device that upon the detection of the secondary computing device switches to being in communication with the secondary computing device;

a primary processing structure running on the primary computing device, which, when the secondary computing device is not in communication with the hub connection device, the primary processing structure:

detects, the hub connection device and the attached peripheral devices;

launches a session;

assigns the attached peripheral devices to the session; and configures them, via device drivers running on the primary computing device, as a terminal to enable user interaction with the session as one of the plurality of terminals supported by the primary computing device;

a secondary processing structure running on the secondary computing device, which, when in communication with the hub connection device:

detects the hub connection device and the attached peripheral devices;

configures the attached peripheral devices, via device drivers running on the secondary computing device, to support user operation of the secondary computing device via the attached peripheral devices.

2. The method of claim 1, wherein additional devices attached to the hub connection device are automatically detected, configured and made accessible to the corresponding user session running on the primary or secondary computing devices.

3. The method of claim 1, wherein in response to the switching to the secondary computing device, the hub connection device sends a dis-connection signal or message to the primary computing device.

4. The method of claim 1 further comprising: in response to the switching from the primary computing device to the secondary computing device, the corresponding user session on the primary computing device is suspended, the session being resumed upon re-establishing communication between the primary computing device and the corresponding hub connection device.

5. The method of claim 1, wherein the hub connection device is drawing power from an external electrical power source, and when connected to the secondary computing device additionally supplies power, to power the secondary computing device or to re-charge a battery within the secondary computing device.

6. The method of claim 1 where at least one of said launching, assigning and configuring is carried out by an additional processing structure in communication with the primary computing device.

7. The method of claim 1, wherein the hub connection device supports at least two connection methods and communication protocols, at least one of which is used for being in communication with the primary computing device, and at least one of which is used for being in communication with the secondary computing device, said switching by the hub connection device being between the at least two connection methods and communication protocols.

8. The method of claim 7 wherein the connection methods and communication protocols are any of: Wired USB; Wireless USB; a Wired Ethernet connection; a Wireless Ethernet connection; a USB over Ethernet connection; a wired connection; a power over Ethernet (PoE) connection; DisplayPort; USB; USB over IP; Ultra-wide-band wireless; wireless short distance; IEEE 802.11 a/b/g/n/ac and successors; wireless display protocol; Power-line communication; a wireless connection; wireless screencasting: mobile device screencasting WiDi; and RTSP.

9. The method of claim 7 wherein said switching occurs via detecting, by the hub connection device, of at least one of:

(a) connecting or disconnecting of wired data cable connections between the hub connection device and the secondary computing device;

(b) connecting or disconnecting of wireless connection between the hub connection device and the secondary computing device;

(c) presence or lack of presence of an Ethernet heart-beat connection;

(d) presence or loss of a data signal from the secondary computing device;

(e) power availability on a USB uplink port on the hub connection device;

(f) connecting or disconnecting of communication with the secondary computing device;

(g) receiving of a disconnection or switching message from a processing structure running on the primary computing device, the primary computing device being in communication with the hub connection device;

(h) receiving a disconnection or of switching command from a processing structure running on the secondary computing device, the secondary computing device being in communication with the hub connection device;

(i) receiving of a disconnection or switching command from a user interacting with the hub connection device;

(j) receiving of a disconnection or switching command from a user interacting with ones of the attached peripheral devices;

(k) receiving of a disconnection or switching command from a user interacting via the at least one attached peripheral input device with an application running within a user session on the primary computing device;

(l) timeout due to exceeding a pre-determined length of time in attempting to establish a connection with a primary or secondary computing device; and (m) a signal generated by a user attaching or detaching a device from the hub connection device.

10. The method of claim 1, wherein during said launching of a session the primary computing device is configured to output to at least one attached peripheral display device any of: an authentication screen; a user session selection screen; a screen-saver; instructions or help messages; a progress indicator; a status indicator; an error message; a screen locked message; an advertising message; a digital signage message; a remote display connection to a thin-client server; or web-browser displaying a web-page.

11. The method of claim 1, wherein the hub connection device is identified by at least one unique identifier that is stored in computer readable memory that is in communication with the processing structure on the primary computing device.

12. The method of claim 11, further comprising the at least one unique identifier being any of: a MAC address, an IP address, a USB path, a USB bus, a USB device ID, a PCI device ID, a device ID, a device serial number, a device manufacturer name, a device type, a number, a device vendor ID or product ID, and a configuration of attached devices.

13. The method of claim 11, further comprising a plurality of hub connection devices, each of the hub connection devices being in communication with its respective attached peripheral devices, wherein association between the hub connection devices and their respective peripheral devices is stored in computer readable memory that is in communication with the processing structure on the primary computing device.

14. The method of claim 1, further comprising: discovering the hub connection devices and the attached peripheral devices by discovery agents running on the primary computing device.

15. The method of claim 1, where the hub connection device is configured to output progress and status messages to at least one attached peripheral display device during the switching and connecting.

16. The method of claim 1, wherein at least one attached peripheral input device is a touch sensor component of a touch screen, and at least one attached peripheral display device is a display component of the touch screen.

17. The method of claim 1, wherein at least one attached peripheral display device is a display component integrated into the hub connection device.

18. The method of claim 1, wherein the attached peripheral devices are USB devices and the hub connection device includes a USB Ethernet bridge chip enabling the primary computing device connecting to this bridge chip to communicate with and use the attached peripheral USB devices behind the Ethernet bridge chip, as if they were directly connected to the USB bus of the primary computing device, and enabling the secondary computing device to directly connect to the attached peripheral USB devices by a USB hub contained within the hub connection device.

19. The method of claim 1, wherein drivers for ones of the attached peripheral devices are stored on non-transient computer readable memory housed within either:
 (a) the hub connection device and made accessible to the secondary computing device when in communication with the secondary computing device; or
 (b) the primary computing device and made accessible to the secondary computing device when the primary computing device and secondary computing device are in communication.

20. The method of claim 1 in which the hub connection device contains an embedded computing device operable as a stand alone computer.

21. A non-transient computer-readable medium having embodied thereon a program for multi-user computing, the program comprising instructions which, when executed by a primary computing device, carry out:
 the detecting, over a network by the processing structure of the primary computing device, multiple hub connection devices and their attached peripheral devices;
 the launching on the primary computing device of a session and configuring one of the attached peripheral devices via device drivers running on the primary computing device to enable user interaction with the session;
 the presenting of graphical output on at least one peripheral display device attached to the hub, and
 the accepting of input from at least one hub-attached peripheral input device;
 said hub connection devices and attached peripheral devices being switchable between connecting to the primary computing device and a secondary computing device;
 the secondary computing device running a secondary processing structure, which, when in communication with the hub connection device:
  detects the hub connection device and the attached peripheral devices;
  configures the attached peripheral devices via device drivers running on the secondary computing device to exclusively support user operation of the secondary computing device.

22. A system of switching a hub connection device, and its attached peripheral devices comprising at least one input device and at least one display device, between a primary computing device being configured to simultaneously support a plurality of hub connection devices operable as independent terminals for multi-user computing, and a secondary computing device for providing expanded access via the attached peripheral devices;
 the system comprising:
 (a) the hub connection device and its attached peripheral devices, being in communication with the primary computing device, that upon the detection of the secondary computing device switches to being in communication with the secondary computing device;
 (b) a primary processing structure running on the primary computing device, which, when the secondary computing device is not in communication with the hub connection device, the primary processing structure:
  detects, the hub connection device and the attached peripheral devices;
  launches a session;
  assigns the attached peripheral devices to the session; and
  configures, them via device drivers running on the primary computing device, as a terminal to enable user interaction with the session as one of the plurality of terminals supported by the primary computing device;
 (c) a secondary processing structure running on the secondary computing device, which, when in communication with the hub connection device:
  detects the hub connection device and the attached peripheral devices;
  configures, the attached peripheral devices, via device drivers running on the secondary computing device, to support user operation of the secondary computing device via the attached peripheral devices.

* * * * *